(12) United States Patent
Ribero et al.

(10) Patent No.: US 11,712,983 B2
(45) Date of Patent: Aug. 1, 2023

(54) DYNAMIC BACKWARD SEAT SLIDING BEFORE IMPACT IN A COMMERCIAL VEHICLE

(71) Applicant: Volvo Truck Corporation, Gothenburg (SE)

(72) Inventors: Raphaël Ribero, Millery (FR); Thomas Partarrieu, Dardilly (FR)

(73) Assignee: Volvo Truck Corporation, Gothenburg (SE)

( * ) Notice: Subject to any disclaimer, the term of this patent is extended or adjusted under 35 U.S.C. 154(b) by 27 days.

(21) Appl. No.: 17/276,141

(22) PCT Filed: Sep. 13, 2018

(86) PCT No.: PCT/EP2018/074780
§ 371 (c)(1),
(2) Date: Mar. 13, 2021

(87) PCT Pub. No.: WO2020/052767
PCT Pub. Date: Mar. 19, 2020

(65) Prior Publication Data
US 2022/0048407 A1    Feb. 17, 2022

(51) Int. Cl.
*B60N 2/02* (2006.01)
*B60N 2/42* (2006.01)
(Continued)

(52) U.S. Cl.
CPC ......... *B60N 2/0276* (2013.01); *B60N 2/4221* (2013.01); *B60N 2/4279* (2013.01);
(Continued)

(58) Field of Classification Search
None
See application file for complete search history.

(56) References Cited

U.S. PATENT DOCUMENTS

| | | | |
|---|---|---|---|
| 6,385,517 B1 | 5/2002 | Kore | |
| 10,011,194 B1 | 7/2018 | Scott et al. | |
| (Continued) | | | |

FOREIGN PATENT DOCUMENTS

| | | | |
|---|---|---|---|
| CN | 108394368 A | 8/2018 | |
| CN | 108860130 A  * | 11/2018 | ............ B60W 10/18 |
| (Continued) | | | |

OTHER PUBLICATIONS

International Search Report and Written Opinion for PCT/EP2018/074777, dated May 17, 2019, 9 pages.
(Continued)

*Primary Examiner* — David E Allred
(74) *Attorney, Agent, or Firm* — Withrow & Terranova, PLLC

(57) ABSTRACT

The invention relates to a safety system for a vehicle seat in a commercial vehicle operating a vehicle seat motion actuation when the commercial vehicle is about to collide with an obstacle, comprising: —at least one actuator unit that comprises at least one seat actuator to move the vehicle seat from a driving position to a safety position—at least one control unit connected to said actuator unit to control the at least one seat actuator—at least one proximity sensor connected to said control unit and configured to detect an obstacle before the commercial vehicle collides it wherein the control unit, upon receiving an imminent and unavoidable collision alert signal from the proximity sensor, controls the at least one seat actuator to move the vehicle seat to the safety position.

9 Claims, 3 Drawing Sheets

(51) Int. Cl.
*B60N 2/427* (2006.01)
*B60R 21/0132* (2006.01)
*B60R 21/0134* (2006.01)

(52) U.S. Cl.
CPC ...... *B60N 2/42736* (2013.01); *B60R 21/0132* (2013.01); *B60R 21/0134* (2013.01)

(56) References Cited

U.S. PATENT DOCUMENTS

| | | | |
|---|---|---|---|
| 10,518,674 B1* | 12/2019 | Aikin | B60R 21/0132 |
| 11,124,143 B1* | 9/2021 | Pertsel | G06V 10/50 |
| 2004/0212226 A1 | 10/2004 | Bethge et al. | |
| 2005/0065688 A1 | 3/2005 | Rao et al. | |
| 2005/0240329 A1 | 10/2005 | Hirota | |
| 2005/0283292 A1 | 12/2005 | Kawato et al. | |
| 2007/0080657 A1 | 4/2007 | Gerding et al. | |
| 2007/0185635 A1 | 8/2007 | Mattes et al. | |
| 2012/0089303 A1* | 4/2012 | Freienstein | B60R 21/02 701/45 |
| 2012/0173085 A1* | 7/2012 | Hilberer | B60N 2/4279 701/46 |
| 2014/0319895 A1 | 10/2014 | Lange-Mao et al. | |
| 2016/0243963 A1* | 8/2016 | Frommann | B60R 21/0136 |
| 2016/0304004 A1* | 10/2016 | Sandbothe | B60N 2/2875 |
| 2019/0283635 A1* | 9/2019 | Yetukuri | B60N 2/0244 |
| 2020/0062146 A1* | 2/2020 | Freienstein | B60N 2/0276 |
| 2020/0171985 A1 | 6/2020 | Yetukuri et al. | |
| 2022/0048406 A1 | 2/2022 | Ribero et al. | |

FOREIGN PATENT DOCUMENTS

| | | |
|---|---|---|
| DE | 19749838 A1 | 6/1999 |
| DE | 102006051240 A1 | 5/2008 |
| DE | 102011108918 A1 | 1/2013 |
| EP | 1609664 A2 | 6/2005 |
| WO | 0145985 A1 | 6/2001 |
| WO | 2011/039789 A1 | 4/2011 |

OTHER PUBLICATIONS

International Search Report and Written Opinion for PCT/EP2018/074780, dated May 7, 2019, 8 pages.
Examination Report for European Patent Application No. 18769679.4, dated Sep. 19, 2022, 5 pages.
Notice of Allowance for U.S. Appl. No. 17/276,140, dated Oct. 26, 2022, 9 pages.
Corrected Notice of Allowability for U.S. Appl. No. 17/276,140, dated Dec. 2, 2022, 4 pages.
Corrected Notice of Allowability for U.S. Appl. No. 17/276,140, dated Jan. 30, 2023, 5 pages.

* cited by examiner

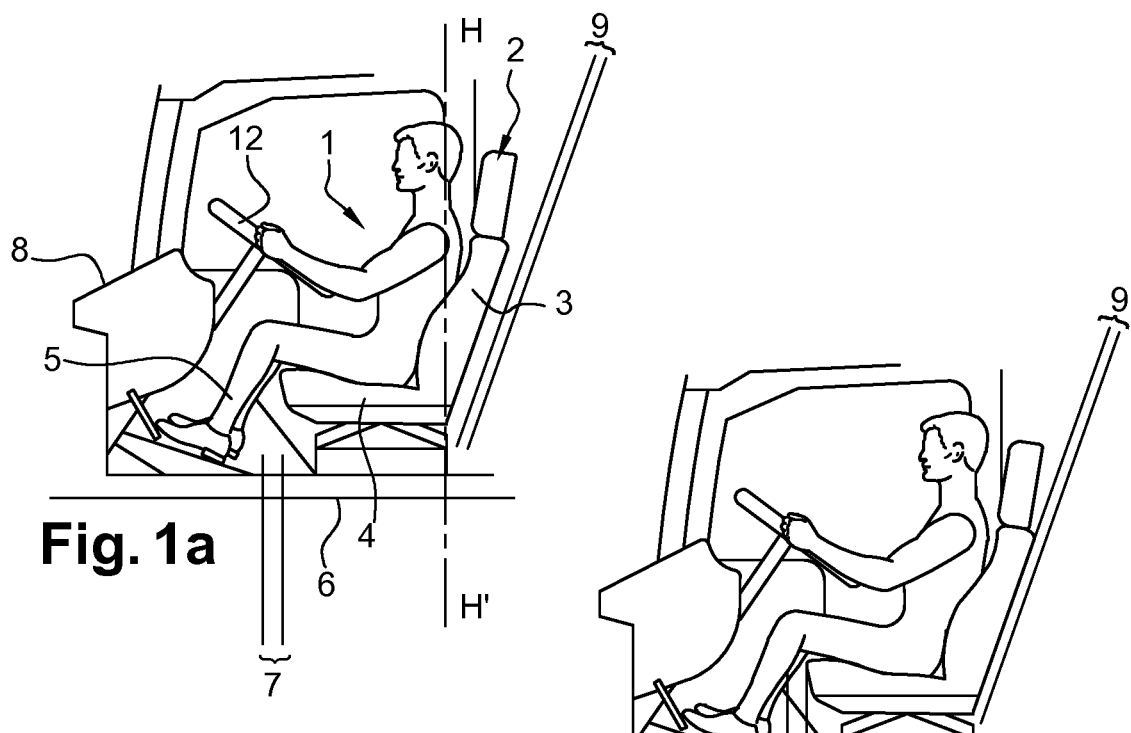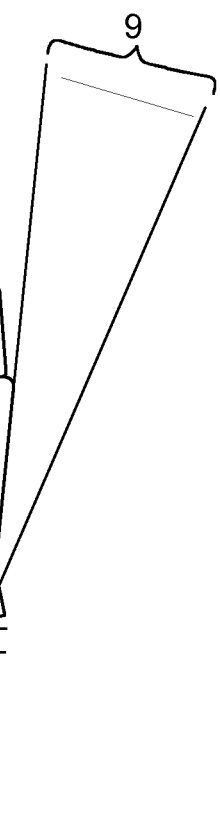

DYNAMIC BACKWARD SEAT SLIDING BEFORE IMPACT IN A COMMERCIAL VEHICLE

This application is a 35 USC 371 national phase filing of International Application No. PCT/EP2018/074780, filed Sep. 13, 2018, the disclosure of which is incorporated herein by reference in its entirety.

TECHNICAL FIELD

The invention relates to a safety system operating a vehicle seat motion actuation in a commercial vehicle just before the vehicle collides with a front object. The invention also relates to a method for actuating a vehicle seat motion in a commercial vehicle just before the vehicle collides with a front object.

The invention is meant to be applied to commercial vehicles such as heavy-duty vehicles, trucks and buses or any vehicles having a distance between the front bumper and the driver that is less than 100 centimetres.

BACKGROUND

A conventional "pre-crash" passive safety system for vehicles comprises a series of sensors that can detect an imminent crash, informing an ECU, that will alert driver attention or activate actuators. Said actuators can help the driver to prevent impact or prepare to the impact various accessories present on vehicle e.g. air-bag, seat belt pre-tensioning devices.

As it is well known, passive safety systems for vehicles aim reducing consequences for passengers.

Some known safety devices for vehicle seat are described in application DE10201108918. The specific solution proposed in this prior art is targeting the synchronization of an airbag deployment with the rearward movement of a seat so that the driver rearward movement enables to have a correct distance or contact between the driver and the airbag. The aim of the present invention is more to create a safety space between the driver and the steering wheel and the dashboard. The airbag is not needed in the present invention to meet the performance targeted. Further, another important aspect of the present invention is that the seat motion is started and fully completed before the crash. When the crash occurs, the seat displacement is over.

Most known pre-crash passive systems only apply to passenger cars and not to commercial vehicles such as trucks.

The solution proposed by applicant in this application is specific to the truck configuration which implies technical specificities in comparison to what is proposed for passenger cars due to the very big differences of the crash sequences between a truck and a passenger car. This is mainly due to the fact that the distance between the front bumper and the driver is dramatically different between a truck and a car: a few dozens of centimetres for a truck and more than one hundred of centimetres for passenger cars. This structural and geometrical difference has as a consequence that the time between the impact and the time when driver's body is enduring the deceleration due to the impact is much shorter for a commercial vehicle such as a truck than for a car. It is therefore considered that existing solutions applicable for a car are not applicable for a truck due to the time available to displace the seat in a truck.

Therefore, there is a need for an improved safety system that is able to prepare the seats of a commercial vehicle before impact with a front object.

SUMMARY

An object of the invention is to provide a safety system that would enable the driver and passenger seats of a commercial vehicle to have enough distance between the seat's occupant and any dashboard obstacles in a few milliseconds just before the impact. To that end, according to a first aspect, the invention concerns a safety system for a vehicle seat in a commercial vehicle, operating a vehicle seat motion actuation when the commercial vehicle is about to collide with an obstacle, comprising:
 at least one actuator unit that comprises at least one seat actuator to move the vehicle seat from a driving position to a safety position
 at least one control unit connected to the actuator unit to control the seat actuator(s)
 at least one proximity sensor connected to said control unit and configured to detect an obstacle before the commercial vehicle collides it wherein the control unit, upon receiving an imminent and unavoidable collision alert signal from the proximity sensor, controls the seat actuator(s) to move the vehicle seat to the safety position.

According to the present invention, the at least one seat actuator moves the vehicle seat to the safety position in a time frame of one second or less from the time the unavoidable collision alert signal is sent from the proximity sensor to the control unit.

The full displacement of the whole seat just before the crash but at a moment when the action undertaken by the driver will not suffice to avoid the collision (i.e. in a time frame of one second or less, more precisely of 600 milliseconds or less—and preferably in between 650 milliseconds and 450 milliseconds) has the benefit to allow the creation of a safety space between the body of the seat's occupant and the dashboard's various obstacles to limit injuries involved by dashboard elements colliding with the body, typically the steering wheel.

Further, in the present invention the at least one seat actuator moves the vehicle seat before the crash itself happens. In other words, the seat's occupant body is placed at a safety distance from the dashboard before the impact occurs. In this way it is easier for the seat's occupant to have a better position to endure the impact and avoid collision with any dashboard obstacle. In this description we also refer to a safety position when referring to this position where the seat's occupant body is placed at a safety distance from the dashboard.

According to a preferred embodiment, the seat motion is a backward seat sliding motion and the safety position corresponds to a specific end backward position of the vehicle seat. It has to be noted that for the present invention, when it is referred to an end backward position, it can be the end of the usual back stroke of the vehicle seat or the end of an additional back stroke that would have been built and added on each vehicle seat for the purpose of the present invention. Thus, the body of the seat's occupant is located further away from the dashboard before the impact occurs.

The backward sliding motion can further be combined with other seat motions having several degrees of liberty or axis i.e. move the seat down on a vertical axis, adjust the back seat position etc. . . . motions that can increase the efficiency of the body preparation and safety.

According to the present invention, the vehicle seat motion is imparted by an actuator unit that comprises at least one seat actuator that can be a motor of any type (electrical, pneumatic, pyrotechnic, mechanical, hydraulic, . . . ) but adapted so that power and speed against volume enable to have an efficient but not a bulky system. The actuator unit also needs to be able to have the seat prepared and have the full seat motion undertaken in only a few milliseconds (about 500 ms) so that motion of the seat is realised between the moment the imminent and unavoidable collision signal is sent by the proximity sensor and before the crash itself happens.

In a preferred embodiment of the present invention, the proximity sensor is an Advanced Emergency Braking System (AEBS) sensor. To improve safety, trucks are now equipped with AEBS, including sensors to collect information and a safety electronic control unit to build an alerting signal for the driver in case of a dangerous traffic situation being detected, such as a risk of collision, and to actuate automatically, if necessary, an emergency braking to stop or reduce the speed of the truck before the collision occurs. Using the AEBS sensor to trigger the actuation of the seat motion permits to have a safety system that does not require human intervention to be effective. Indeed, the seat adjustment occurs therefore at a time that is so close to the crash that it would have no benefit to try to steer the vehicle in other directions and braking is already being actuated automatically by the AEBS functionality.

According to a second aspect, the invention concerns a vehicle seat arrangement comprising a passive safety system as previously described.

According to a third aspect, the invention concerns a commercial vehicle comprising at least one seat provided with the vehicle seat arrangement mentioned above. Further, when the obstacle is a front obstacle and when the vehicle is moving forward, the vehicle seat motion triggered by the passive safety system of the present invention is a backward seat sliding motion.

According to a fourth aspect, the invention concerns a method for actuating a vehicle seat motion in a commercial vehicle provided with a passive safety system according to the present invention, when the vehicle is about to collide with an obstacle, wherein the control unit of the system proceeds at least with the following steps:

receiving an imminent collision signal from the proximity sensor sending an alert to the at least one seat actuator to get the at least one seat actuator prepared to move the vehicle seat receiving an imminent and unavoidable collision signal from the proximity sensor controlling the at least one seat actuator to move the seat to the safety position and advantageously in a time frame of one second or less from the time the imminent and unavoidable collision alert signal is sent from the proximity sensor to the control unit, before the impact itself occurs.

In other words the above methods enables to trigger the motion of the whole seat in a very short time frame of about 500 milliseconds so that the whole seat is moved backward right before the crash but at a moment when the action undertaken by the driver will not suffice to avoid the collision and so that at the moment of the impact, the displacement of the whole seat is over, the seat is not moving backwards anymore, and the seat's occupant position is optimum to undergo a crash.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 1a to 1c are schematic representations from the side of the seat and its occupant at different moment during the average 600 milliseconds in between the moment the imminent collision signal is sent by the proximity sensor and before the crash itself happens.

DETAILED DESCRIPTION OF EXAMPLE EMBODIMENTS OF THE INVENTION

Figure 4:
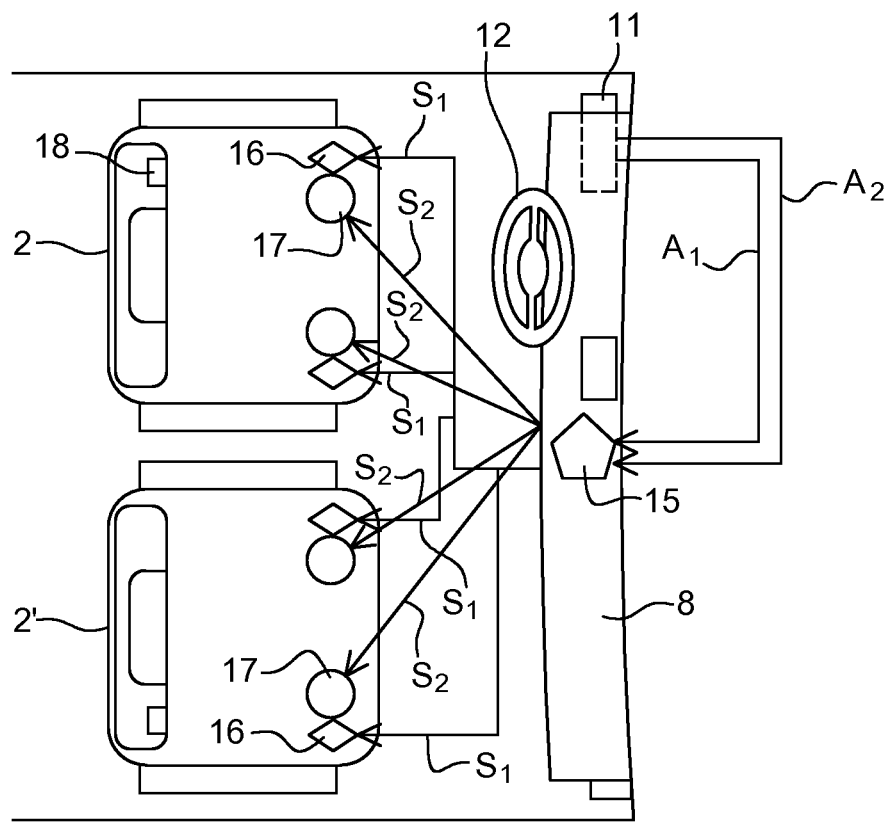
FIG. 4 is a schematic top view of the interior of a commercial vehicle's cab provided with a safety system according to one possible embodiment of the present invention.

Reference to FIG. 4 is made all along the following description in combination with the other figures.

FIGS. 1a to 1c are schematic representations from the side of the seat and its occupant at different moments during the short period of time in between the moment the imminent collision signal is sent by the proximity sensor and before the crash itself happens.

FIG. 1a shows the seat occupant 1 before the imminent collision signal is sent. In FIG. 1a seat 2 and driver 1 are in a normal driving position.

For the ease of the understanding we will use "driver" to designate the seat's occupant but it has to be understood that it could also be a passenger sitting on a seat provided with the device of the present invention.

In FIG. 1a, the driver 1 is seated in his vehicle seat 2 with his back resting on the back seat 3 that is inclined according to the driver's preferences when driving. The sitting portion 4 of the seat 2 that receives the buttocks and upper thighs 5 of the driver 1 is almost parallel to the ground floor 6 of the vehicle's cab. The head 7 and neck 8 of the driver 1 are in a perfect driving position i.e. aligned along an axis HH' that is almost perpendicular to the ground floor 6 of the vehicle's cab.

This position is the same as the one about 600 milliseconds before the impact shown in FIG. 1b. In FIG. 1b, we are in fact milliseconds before the impact and at that moment the seat's actuators 16 (see FIG. 4) are warned by the proximity sensor 11 that a crash is imminent. The actuators 16 are getting prepared for a quick backward movement (in a timeframe of 500 milliseconds or less) but the seat 2 is not yet moving backward in order to let the driver 1 a full control of the vehicle 20 for the longest possible period of time and the ability to use the steering wheel 12 in order to avoid the obstacle for instance. The distance between the seat 2 and the dashboard 8 is shown with reference 7, the inclination of the back seat 3 between in the normal driving position and 600 milliseconds before the impact is shown with reference 9.

The seat motion actuators may be for example, electrical actuators where electrical motors will rotate a threaded screw on which the seat is fixed in order to make the seat moving backward. Another type of actuators that can be envisaged for the present invention are pneumatic actuators using a cylinder with a piston equipped with a pressurized chamber in which a high pressure is constantly applied. This high pressure can be released into the piston chamber via a controlled valve making the piston on which the seat is fixed moving quickly along a longitudinal axis (i.e. along the longitudinal direction of the vehicle, in a backwards direction). Another type of actuators to be considered are the pyrotechnic actuators which are similar to the pneumatic actuators except that the piston movement is actuated by an explosion involving a gas dissipation creating a high pressure in the piston chamber ending in the piston on which the seat is fixed move along a longitudinal axis i.e. making the seat move along a longitudinal axis of the vehicle i.e. in a backwards direction. Finally, mechanical actuators could also be used. These ones using a compressed spring that is released via a controlled actuator to push an axle on which the seat is fixed could also enable a quick motion of the seat in a backwards direction.

A few milliseconds later, at about 500 milliseconds before the impact, if the proximity sensor 11 detects that the imminent collision is unavoidable, it sends a signal to the seat actuators 16 that are hence immediately operated and start to push the seat backward in order to create a safety space between the body of the seat's occupant 1 and the dashboard's various obstacles 12. The seat's metrics are also adjusted. Indeed in FIG. 1*c* showing the driver position at the moment when the impact occurs, it is clearly shown that not only the seat 2 has been totally moved backward (distance 7 is increased) and is further away from the dashboard 8 but also the back seat 3 has been moved forward and is in a vertical position i.e. almost perpendicular to the ground floor 6 of the vehicle's cab (the inclination of the back seat 3 between in the normal driving position and about 500 milliseconds before the impact is shown with reference 9) and in the end the seat belt is tightly pretensed and most slack is eliminated. Therefore, thanks to the present invention, the body of the driver 1 has been put in a safer position. At the moment of the impact the motion of the seat is fully completed and the seat 2 is not moving anymore, the seat is in a safety position. The fact that the seat motion is processed right just before the impact (i.e. at about 500 milliseconds before the impact) and yet achieved before the impact occurs, enables to have a force limiter effect that is much smoother than if the seat 2 was still in its driving position. Indeed, the distance between the driver 1 and the dashboard 8 being increased, the seat 2 having no motion anymore, there is hence more time to dissipate the energy and control the effort so that the risk of upper body injuries being caused to the driver 1 by the force exerted by the seat belt is decreased.

Additionally, pre-tensioners 18 are actuated to re-enforce this above mentioned smooth and controlled force limiter effect.

Figure 2:
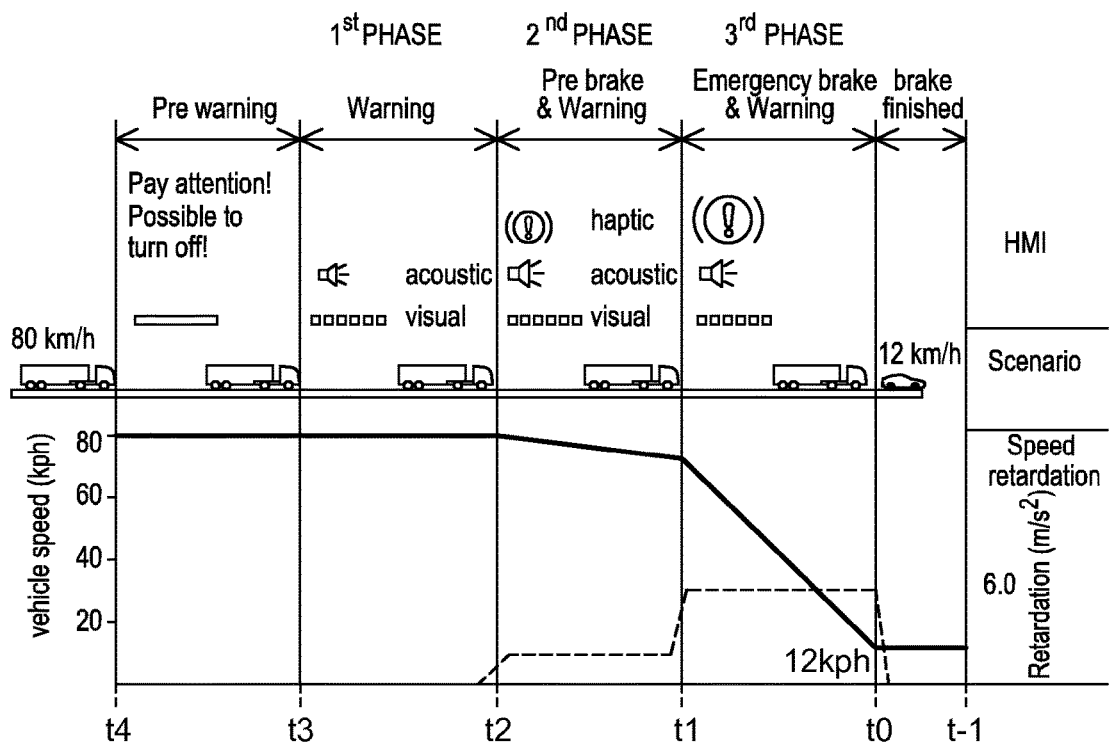
FIG. 2 is a picture showing the different AEBS phases and for each phase there is shown the human machine interface signals sent to the driver, the vehicle speed and the vehicle retardation (i.e. the slowdown of a body movement when this slowdown is the effect of a particular cause).

FIG. 2 is a picture showing the different AEBS phases and for each phase is shown the human machine interface signals, the vehicle speed and the vehicle retardation.

As mentioned above, in a preferred embodiment of the present invention, the proximity sensor 11 is an Advanced Emergency Braking System (AEBS) sensor.

There are three main AEBS phases.

The first phase is initiated when cameras and radars installed on the front part of the truck detect that a collision has a very high probability to happen i.e. above 90% risks of a collision to happen so there is still a slight chance to avoid the collision if the driver reacts properly e.g. a steering wheel movement. This first phase is triggering audio and visual alerts to warn the driver that he has to act in order to avoid the collision.

The second phase is initiated when cameras and radars installed on the front part of the truck still detect that the collision has a very high probability to happen meaning that the driver didn't take any action to avoid the collision. This second phase does not require a full braking performance, even if it is already applying a strong braking request. This second phase is to lower the vehicle speed (e.g. stop the acceleration and start to slow down the vehicle) and mainly to warn the driver in addition to other audible and visual alerts set preliminary in the first phase.

The third phase is initiated when the collision is imminent e.g. will happen in less than one second, and that the driver did not take any action after phase 1 and 2 (alerts and pre brake) or that the action undertaken by the driver will not suffice to avoid the collision. This third phase requests the maximum braking possibility of the vehicle considering that entering that third phase means an unavoidable collision.

By using the AEBS sensor as a proximity sensor 11 for the safety system of the present invention, this enables to inform the driver and passenger seats 2, 2' prior to a maximum braking performance request. Indeed, the AEBS system usually comprises at least a radar combined with a camera, and can detect an obstacle located at a quite long distance such a few dozens of meters. Therefore, the system can track the object in advance and build a collision's imminence information along the time accumulating data. As long as the object is detected, the system can monitor the delta speed between the truck itself and the object upfront. Knowing the dynamics parameters of the truck (weight, braking possibilities depending on the weight etc. . . . ) the system can be calibrated to determine when a collision becomes unavoidable. A collision is therefore considered unavoidable using a combination of information by the AEBS system such as:

- the obstacle speed
- the vehicle speed
- the difference between the obstacle speed and the vehicle speed
- the vehicle's braking possibilities depending on the weight of the vehicle
- the vehicle's breaking possibilities based on the road conditions (temperature, rain and/or ice on the road)
- the steering wheel angle
- the possible trajectory of the vehicle at each steering wheel angle All these information can be used by the system to determine a certain point in time when the collision cannot be avoided even if the driver will finally turn the steering wheel or if the driver already turns it. The system is therefore able to adjust the alert timing and the braking timing. Combining the safety system of the present invention to such an AEBS system offers the possibility to prepare the seat movement when the collision is imminent but only trigger and engage the seat(s) motion when the collision is unavoidable. Advantageously, the AEBS system may comprise further sensors to further help obstacle's detection such as ultrasonic sensors (short range), radars (Miliwaves and Microwaves), lidars, cameras . . . .

The driver and passenger seats 2, 2' will therefore have their positions adjusted thanks to the fact that seat motion actuators 16 have received the information up front, offering the possibility for the seats to get prepared for a quick adjustment just before the impact as detailed above with FIGS. 1a to 1c.

The additional advantage of the present invention is that knowing the collision is imminent and the AEBS system being able to determine a certain point in time when the collision cannot be avoided it is therefore possible to initiate the seat motion at the exact moment so that the whole seat motion has been fully operated when the body of the driver 1 receives the deceleration force due to the impact.

Further, it enables to put the body of the driver 1 in the safest possible position to endure a crash without requesting an intervention from the driver 1 i.e. if the driver 1 is unconscious, the system will still be able to position the driver's body in the safety position, better prepared to undergo a crash.

Figure 3:
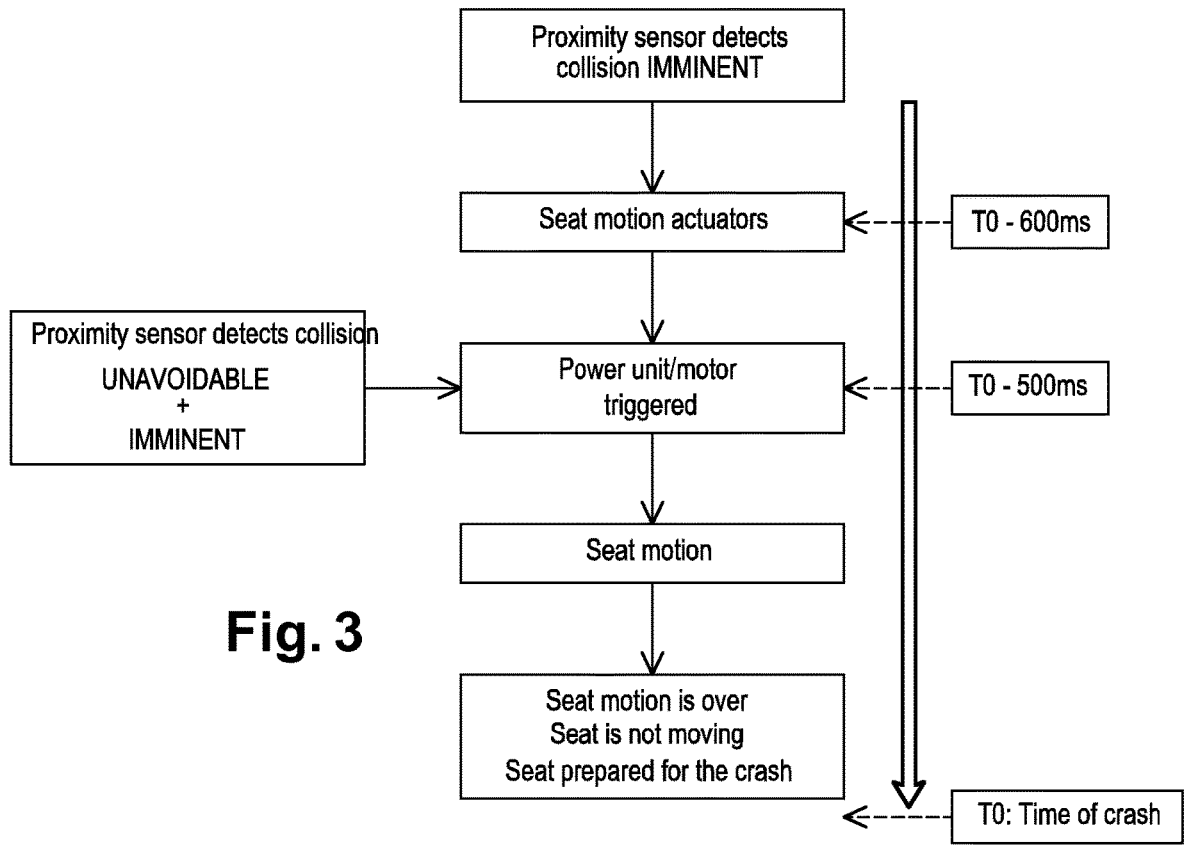
FIG. 3 is a flowchart showing a sequence of operations for the safety device to actuate the vehicle seat motion according to the present invention.

FIG. 3 is a flowchart showing a sequence of operations for the safety device to actuate the vehicle seat motion according to the present invention. As mentioned earlier the vehicle is provided with several types of sensors that could be integrated in devices such as a camera or a radar. These sensors collect data that are sent to a specific control unit 15. If this control unit 15 receives a signal A1 from the proximity sensor 11 that an imminent collision is to happen, this control unit 15 will in turn send a signal S1 to the seat's actuators 16 using any type of communication means such as a software communication line (BUS) or a hardware communication line (electric impulsions via a wire) or even a wireless communication means.

Once the actuators 16 have received the signal S1 seats 2, 2' are prepared for a quick motion. If the control unit 15 receives a few milliseconds later a second signal A2 from the proximity sensor 11 that the imminent collision is unavoidable, the control unit 15 will in turn send a signal S2 to the actuator units to trigger the seats motion. The system enables to position the driver 1 in the safest possible position to undergo a crash with a safety space in between his/her body and the dashboard 8.

Therefore the sequence of operations for the safety device to actuate the vehicle seat motion according to the present invention can be:
- The control unit 15 receives an imminent collision alert A1 from the proximity sensor 11 and then immediately sends a signal S1 to the seat's actuator(s) 16 to get the actuator(s) 16 prepared for quick seat motion.
- The control unit 15 receives a second alert A2 that collision is unavoidable from the proximity sensor 11 and sends immediately a triggering signal S2 to the power unit(s) of the actuator(s) 16.
- The triggered power unit(s) of the seat actuator(s) 16 move(s) the seat(s) 2, 2' in a very short time frame of about 500 milliseconds
- The whole seat 2, 2' is moved backward right before the crash but at a moment when the action undertaken by the driver will not suffice to avoid the collision
- At the moment of the impact, the whole seat is in the safety position i.e. the displacement of the whole seat 2, 2' is over and the seat's occupant's position is therefore optimum to undergo a crash.

It is to be understood that the present invention is not limited to the embodiments described above and illustrated in the drawings; rather, the skilled person will recognize that many changes and modifications may be made within the scope of the appended claims.

The invention claimed is:

1. A safety system for a vehicle seat in a commercial vehicle operating a vehicle seat motion actuation when the commercial vehicle is about to collide with an obstacle, comprising:
   at least one actuator unit that comprises at least one seat actuator to move the vehicle seat from a driving position to a safety position;
   at least one control unit connected to said actuator unit to control the at least one seat actuator; and
   at least one proximity sensor connected to said control unit and configured to detect an obstacle before the commercial vehicle collides it,
   wherein the control unit, upon receiving an imminent collision signal from the proximity sensor, sends an alert signal to the at least one seat actuator, said alert signal comprising an alert prompting the at least one seat actuator to get prepared to move the vehicle seat, the alert signal being sent while collision can still be avoided,
   wherein the control unit, upon receiving an imminent and unavoidable collision alert signal from the proximity sensor, controls the at least one seat actuator to move the vehicle seat to the safety position.

2. The safety system of claim 1 wherein the at least one seat actuator moves the vehicle seat before the crash itself happens.

3. The safety system of claim 1 wherein the safety position corresponds to an end backward position of the vehicle seat.

4. The safety system of claim 1 wherein the seat actuator is a motor that is an electric, a pneumatic, a pyrotechnic, a hydraulic or a mechanic motor.

5. The safety system of claim 1 wherein the proximity sensor is an Advanced Emergency Braking System sensor.

6. The safety system of claim 1 wherein a backward seat sliding motion is combined with other seat movements to adjust a metric of the vehicle seat.

7. The safety system of claim 1 wherein when the obstacle is a front obstacle and when the vehicle is moving forward, the vehicle seat motion is a backward seat sliding motion.

8. A method for actuating motion of a vehicle seat provided with a passive safety system, comprising:
   receiving, by a control unit, an imminent collision signal from a proximity sensor;
   sending, by the control unit, an alert signal to at least one seat actuator, the alert signal comprising an alert prompting the at least one seat actuator to get prepared to move the vehicle seat, the alert signal being sent while collision can still be avoided;
   receiving, by the control unit, an imminent and unavoidable collision signal from the proximity sensor; and
   controlling, by the control unit, the at least one seat actuator to move the vehicle seat to a safety position.

9. The method of claim 8 wherein the whole vehicle seat is moved to the safety position before the impact itself occurs.

* * * * *